US010289810B2

(12) United States Patent
Arngren et al.

(10) Patent No.: US 10,289,810 B2
(45) Date of Patent: May 14, 2019

(54) METHOD, CONTENT OWNER DEVICE, COMPUTER PROGRAM, AND COMPUTER PROGRAM PRODUCT FOR DISTRIBUTING CONTENT ITEMS TO AUTHORIZED USERS

(71) Applicant: Telefonaktiebolaget LM Ericsson (publ), Stockholm (SE)

(72) Inventors: Tommy Arngren, Södra Sunderbyn (SE); Mats Näslund, Bromma (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 309 days.

(21) Appl. No.: 14/914,849

(22) PCT Filed: Feb. 27, 2014

(86) PCT No.: PCT/SE2014/050240
§ 371 (c)(1),
(2) Date: Feb. 26, 2016

(87) PCT Pub. No.: WO2015/030646
PCT Pub. Date: Mar. 5, 2015

(65) Prior Publication Data
US 2016/0210443 A1    Jul. 21, 2016

Related U.S. Application Data

(60) Provisional application No. 61/871,455, filed on Aug. 29, 2013.

(30) Foreign Application Priority Data

Sep. 10, 2013    (WO) .................. PCT/SE2013/051053

(51) Int. Cl.
*G06F 21/00*    (2013.01)
*G06F 21/10*    (2013.01)
(Continued)

(52) U.S. Cl.
CPC ............ *G06F 21/10* (2013.01); *H04L 9/0822* (2013.01); *H04L 9/0861* (2013.01);
(Continued)

(58) Field of Classification Search
CPC ..... H04L 63/0428; H04L 67/06; H04L 67/20; H04L 2209/60; H04L 2463/062;
(Continued)

(56) References Cited

U.S. PATENT DOCUMENTS 5,678,040 A    10/1997   Vasudevan et al.
5,832,495 A    11/1998   Gustman
(Continued)

FOREIGN PATENT DOCUMENTS

EP    1 024 437 A2    8/2000
EP    1 220 541 A2    7/2002
(Continued)

OTHER PUBLICATIONS

National Phase of PCT/SE2014/050027, U.S. Appl. No. 14/915,408, filed Feb. 29, 2016, 57 pages.
(Continued)

*Primary Examiner* — Christopher C Harris
(74) *Attorney, Agent, or Firm* — Patent Portfolio Builders, PLLC

(57) ABSTRACT

Disclosed is, among other things, a method for distributing content items to authorized users. The method comprising: a content owner device (190), COD, obtaining a first content item (196a); the COD (190) obtaining a first tag associated with the first content item (196a); the COD (190) obtaining a first content key, CK1, for said first content item (196a); the COD (190) encrypting the first content item (196a) using CK1, thereby producing a first encrypted content item; the COD (190) using at least the first tag and a key derivation function, KDF, to derive a first derived key, DK1; the COD
(Continued)

(190) encrypting CK1 using the DK1, thereby producing a first encrypted content key, ECK1; and the COD (190) transmitting information to a content server (108), the information comprising: the first encrypted content item and the first tag.

18 Claims, 8 Drawing Sheets

(51) Int. Cl.
 *H04L 9/08* (2006.01)
 *H04L 29/06* (2006.01)
(52) U.S. Cl.
 CPC .......... *H04L 63/0428* (2013.01); *H04L 63/06* (2013.01); *H04L 63/061* (2013.01); *H04L 63/10* (2013.01); *G06F 2221/0717* (2013.01); *H04L 2463/062* (2013.01)
(58) Field of Classification Search
 CPC .......... G06F 21/6218; G06F 17/30106; G06F 17/3002; G06F 17/3012; G06F 21/60; G06F 17/30477; G06F 17/30312
 See application file for complete search history.

(56) References Cited

U.S. PATENT DOCUMENTS

| | | | |
|---|---|---|---|
| 5,963,940 | A | 10/1999 | Liddy et al. |
| 6,026,388 | A | 2/2000 | Liddy et al. |
| 6,363,380 | B1 | 3/2002 | Dimitrova |
| 6,374,260 | B1 | 4/2002 | Hoffert |
| 6,484,156 | B1 | 11/2002 | Gupta et al. |
| 6,643,643 | B1 | 11/2003 | Lee et al. |
| 7,131,059 | B2 | 10/2006 | Obrador |
| 7,149,359 | B1 | 12/2006 | Omoigui |
| 7,382,933 | B2 | 6/2008 | Dorai et al. |
| 7,493,312 | B2 | 2/2009 | Liu et al. |
| 7,627,556 | B2 | 12/2009 | Liu et al. |
| 7,676,495 | B2 | 3/2010 | Qian |
| 7,725,453 | B1* | 5/2010 | Chen ................ G06F 17/30864 707/711 |
| 8,060,906 | B2 | 11/2011 | Begeja et al. |
| 8,065,301 | B2 | 11/2011 | Ginsburg et al. |
| 8,166,029 | B2 | 4/2012 | Park et al. |
| 8,438,157 | B2 | 5/2013 | Adams, Jr. |
| 8,442,994 | B1* | 5/2013 | Chen ................ G06F 17/30864 707/711 |
| 8,566,370 | B2 | 10/2013 | Jin et al. |
| 8,611,422 | B1 | 12/2013 | Yagnik et al. |
| 8,914,632 | B1* | 12/2014 | Shankar ................ H04L 63/101 713/167 |
| 9,292,552 | B2 | 3/2016 | Arngren et al. |
| 9,633,015 | B2 | 4/2017 | Arngren |
| 2001/0047379 | A1 | 11/2001 | Jun et al. |
| 2002/0054083 | A1 | 5/2002 | Boreczky et al. |
| 2002/0097983 | A1 | 7/2002 | Wallace et al. |
| 2002/0161747 | A1 | 10/2002 | Li et al. |
| 2003/0033347 | A1 | 2/2003 | Bolle |
| 2003/0105589 | A1 | 6/2003 | Liu et al. |
| 2003/0107592 | A1 | 6/2003 | Li et al. |
| 2003/0108334 | A1 | 6/2003 | Nevenka et al. |
| 2004/0025180 | A1 | 2/2004 | Begeja et al. |
| 2004/0111432 | A1 | 6/2004 | Adams, Jr. et al. |
| 2004/0162870 | A1 | 8/2004 | Matsuzaki et al. |
| 2004/0215663 | A1 | 10/2004 | Liu et al. |
| 2004/0220925 | A1 | 11/2004 | Liu et al. |
| 2005/0102312 | A1 | 5/2005 | Ohya et al. |
| 2005/0114357 | A1 | 5/2005 | Chengalvarayan et al. |
| 2005/0222981 | A1 | 10/2005 | Lawrence et al. |
| 2006/0122984 | A1 | 6/2006 | Byers et al. |
| 2006/0149624 | A1 | 7/2006 | Baluja et al. |
| 2006/0218191 | A1 | 9/2006 | Gopalakrishnan |
| 2006/0282336 | A1 | 12/2006 | Huang |
| 2007/0033515 | A1 | 2/2007 | Sull et al. |
| 2007/0056046 | A1* | 3/2007 | Claudatos ............... G06F 21/57 726/28 |
| 2007/0067304 | A1 | 3/2007 | Ives |
| 2007/0106646 | A1 | 5/2007 | Stern et al. |
| 2007/0106660 | A1 | 5/2007 | Stern et al. |
| 2007/0220025 | A1 | 9/2007 | Hyman |
| 2007/0250810 | A1 | 10/2007 | Tittizer et al. |
| 2008/0016101 | A1 | 1/2008 | Ginsburg et al. |
| 2008/0016293 | A1 | 1/2008 | Saika |
| 2008/0086688 | A1 | 4/2008 | Chandratillake et al. |
| 2008/0109881 | A1* | 5/2008 | Dasdan ............. G06F 17/30876 726/4 |
| 2008/0112690 | A1 | 5/2008 | Shahraray et al. |
| 2008/0124055 | A1 | 5/2008 | Shahraray et al. |
| 2008/0232775 | A1 | 9/2008 | Ljolje |
| 2008/0310628 | A1 | 12/2008 | Fujioka et al. |
| 2009/0006368 | A1 | 1/2009 | Mei |
| 2009/0019034 | A1 | 1/2009 | Franks et al. |
| 2009/0041356 | A1 | 2/2009 | Barbieri et al. |
| 2009/0110296 | A1 | 4/2009 | Sekiguchi et al. |
| 2009/0116645 | A1 | 5/2009 | Jeong et al. |
| 2009/0138472 | A1 | 5/2009 | MacLean |
| 2009/0154806 | A1 | 6/2009 | Chang et al. |
| 2009/0210779 | A1 | 8/2009 | Badoiu et al. |
| 2009/0240674 | A1 | 9/2009 | Wilde |
| 2009/0299725 | A1 | 12/2009 | Grigsby et al. |
| 2009/0300351 | A1 | 12/2009 | Lei et al. |
| 2010/0005121 | A1 | 1/2010 | Benitez et al. |
| 2010/0070485 | A1 | 3/2010 | Parsons et al. |
| 2010/0094630 | A1 | 4/2010 | Yoakum |
| 2010/0138292 | A1 | 6/2010 | Park et al. |
| 2010/0158470 | A1 | 6/2010 | Tzoukermann et al. |
| 2010/0161580 | A1 | 6/2010 | Chipman et al. |
| 2010/0211781 | A1* | 8/2010 | Auradkar ............ G06F 21/6209 713/168 |
| 2011/0010372 | A1 | 1/2011 | Sahasrabudhe et al. |
| 2011/0040967 | A1* | 2/2011 | Waller .................... G06F 21/10 713/161 |
| 2011/0047163 | A1 | 2/2011 | Chechik et al. |
| 2011/0072012 | A1 | 3/2011 | Ah-Pine |
| 2011/0154405 | A1 | 6/2011 | Isaias |
| 2011/0208722 | A1 | 8/2011 | Hannuksela |
| 2011/0249956 | A1 | 10/2011 | Komai |
| 2011/0258188 | A1 | 10/2011 | AbdAlmageed et al. |
| 2011/0299721 | A1 | 12/2011 | He et al. |
| 2012/0023084 | A1 | 1/2012 | Lalji et al. |
| 2012/0089580 | A1 | 4/2012 | Yamashita et al. |
| 2012/0110080 | A1 | 5/2012 | Panyam et al. |
| 2012/0124055 | A1 | 5/2012 | Deubel et al. |
| 2012/0158713 | A1 | 6/2012 | Jin et al. |
| 2013/0061035 | A1* | 3/2013 | Hook ..................... H04L 9/088 713/150 |
| 2013/0151534 | A1 | 6/2013 | Luks et al. |
| 2013/0166587 | A1 | 6/2013 | Berry |
| 2013/0219024 | A1 | 8/2013 | Flack |
| 2013/0226930 | A1 | 8/2013 | Arngren et al. |
| 2013/0282687 | A1 | 10/2013 | Ah-Pine et al. |
| 2014/0032538 | A1 | 1/2014 | Arngren et al. |
| 2014/0032562 | A1 | 1/2014 | Arngren et al. |
| 2014/0222755 | A1 | 6/2014 | Söderberg et al. |
| 2014/0229488 | A1 | 8/2014 | Arngren et al. |
| 2015/0234824 | A1 | 8/2015 | Arngren et al. |
| 2015/0312259 | A1* | 10/2015 | Alpha ................ H04L 63/0428 726/4 |
| 2016/0085860 | A1 | 3/2016 | Wallenberg et al. |
| 2016/0217171 | A1 | 7/2016 | Arngren et al. |

FOREIGN PATENT DOCUMENTS

| | | |
|---|---|---|
| EP | 1 480 100 A1 | 11/2004 |
| EP | 2216731 A2 | 8/2010 |
| EP | 2323046 A1 | 5/2011 |
| EP | 2 444 921 A2 | 10/2011 |
| EP | 2657884 A2 | 10/2013 |
| WO | 01/17163 A1 | 3/2001 |
| WO | 02/084980 A1 | 10/2002 |

(56) References Cited

FOREIGN PATENT DOCUMENTS

| WO | 2010/150226 A2 | 12/2010 |
| --- | --- | --- |
| WO | 2011/104428 A1 | 9/2011 |
| WO | 2012/001216 A1 | 1/2012 |
| WO | 2014/185834 A1 | 11/2014 |
| WO | 2015/030645 A1 | 3/2015 |
| WO | 2015/030646 A1 | 3/2015 |

OTHER PUBLICATIONS

International Search Report and Written Opinion of the ISA issued for International Patent Application No. PCT/SE2014/050027 dated Nov. 3, 2014, 10 pages.

Lew, M.S., et al. "Content-Based Multimedia Information Retrieval: State of the Art and Challenges," ACM Transactions on Multimedia Computing, Communications and Applications, vol. 2, No. 1, Feb. 2006, pp. 1-19.

"MPEG-7 Overview," International Organisation for Standardisation, ISO/IEC JTC1/SC29/WG11, Coding of Moving Pictures and Audio, Oct. 2004, pp. 1-95.

Non-Final Office Action for U.S. Appl. No. 13/688,566, dated Sep. 10, 2014, 10 pages.

Non-Final Office Action for U.S. Appl. No. 13/688,566, dated Mar. 12, 2015, 11 pages.

Final Office Action for U.S. Appl. No. 13/688,566, dated Sep. 10, 2015, 16 pages.

Examiner-Initiated Interview Summary for U.S. Appl. No. 13/688,566 of Nov. 16, 2015, 1 page.

Notice of Allowance for U.S. Appl. No. 13/688,566, dated Dec. 30, 2015, 19 pages.

Non-Final Office Action for U.S. Appl. No. 13/408,448 dated Feb. 6, 2013, 15 pages.

Non-Final Office Action for U.S. Appl. No. 13/408,448 dated Jun. 14, 2013, 19 pages.

Final Office Action for U.S. Appl. No. 13/408,448 dated Dec. 5, 2013, 21 pages.

Non-Final Office Action for U.S. Appl. No. 13/408,448 dated Apr. 7, 2014, 21 pages.

Final Office Action for U.S. Appl. No. 13/408,448 dated Aug. 29, 2014, 28 pages.

Advisory Action for U.S. Appl. No. 13/408,448 dated Nov. 7, 2014, 3 pages.

Weisstein, Eric W. "Probability Axioms," From MathWorld—A Wolfram Web Resource. http://mathworld.wolfram.com/ProbabilityAxioms.html, 1 page.

Examiner's Answer to Appeal Brief for U.S. Appl. No. 13/408,448 dated May 18, 2015, 10 pages.

Non-Final Office Action for U.S. Appl. No. 13/559,258, dated Aug. 15, 2013, 15 pages.

Final Office Action for U.S. Appl. No. 13/559,258, dated Feb. 4, 2014, 20 pages.

Advisory Action for U.S. Appl. No. 13/559,258, dated Apr. 21, 2014, 3 pages.

Non-Final Office Action for U.S. Appl. No. 13/559,258, dated Dec. 31, 2014, 17 pages.

Final Office Action for U.S. Appl. No. 13/559,258, dated Jun. 19, 2015, 23 pages.

Advisory Action for U.S. Appl. No. 13/559,258, dated Aug. 27, 2015, 3 pages.

Non-Final Office Action for U.S. Appl. No. 13/559,258, dated Jan. 20, 2016, 23 pages.

International Search Report and Written Opinion of the ISA issued for International Patent Application No. PCT/SE2013/050536, dated Apr. 10, 2014, 17 pages.

Lawto et al., "A Scalable Video Search Engine Based on Audio Content Indexing and Topic Segmentation," Turin, Italy, Sep. 2011, http://hal.archivesouvertes.fr/docs/00/64/52/28/PDF/NEMSummit2011_final2.pdf [retrieved on Apr. 2, 2014], 6 pages.

Yang, W. et al., "Discriminative Tag Learning on YouTube Videos with Latent Sub-tags," in proceeding of The 24th IEEE Conference on Computer Vision and Pattern Recognition, CVPR 2011, Colorado Springs, CO, USA, Jun. 20-25, 2011, pp. 3217-3224.

Garcia, E., "The Term Count Model: Demystifying Terra Vector Calculations," Oct. 27, 2006, 7 pages, http://web.archive.org/web/20121029050356/http://www.miislita.com/term-vector/term-vector-2.html.

www.google.com print screen of "Obama" search results, Aug. 16, 2013, 3 pages.

Extended European Search Report for European Patent Application No. 14839431.5, dated Jul. 22, 2016, 9 pages.

Final Office Action for U.S. Appl. No. 13/559,258, dated Sep. 9, 2016, 39 pages.

International Search Report and Written Opinion of the International Searching Authority issued in corresponding International application No. PCT/SE2014/050240, dated Dec. 8, 2014, 14 pages.

Cisco Systems, Inc., "Cisco Visual Networking Index: Forecast and Methodology, 2012-2017," Cisco White Paper, May 29, 2013, 15 pages.

Cisco Systems, Inc., "Press Release: Cisco Global Cloud Index Forecasts Cloud Traffic to Grow Sixfold by 2016," retrieved Jul. 8, 2014, dated Oct. 23, 2012, 5 pages.

Cisco Systems, Inc., Cisco Visual Networking Index: Global Mobile Data Traffic Forecast Update, 2012-2017, Cisco White Paper, Feb. 6, 2013, 34 pages.

Excerpt of Prosecution History of U.S. Appl. No. 13/559,258 dated Sep. 9, 2016-Dec. 2, 2016 45 pages.

Excerpt of Prosecution History of U.S. Appl. No. 13/408,448 dated Nov. 1, 2016-May 9, 2014 45 pages.

Supplementary European Search Report for European Patent Application No. 14893538 dated Mar. 6, 2017, 3 pages.

International Search Report and Written Opinion issued in International Application No. PCT/SE2014/050655, dated Mar. 2, 2015, 15 pages.

Saracoglu, Ahmet et. al.,"Content Based Copy Detection with Coarse, Audio-Visual Fingerprints", 2009 Seventh International Workshop on Content-Based Multimedia Indexing, 2009, IEEE, 6 pages.

Youtube and Shazam homepages retrieved on May 26, 2014, 2 pages.

9th International Workshop on Content-Based Multimedia Indexing (CBMI 2011), homepage, 2 pages, http://www-vpu.eps.uam.es/cbmi2011/.

Excerpt of Prosecution History of U.S. Appl. No. 13/764,219, dated Aug. 2014-May 2016 , 156 pages.

Excerpt of Prosecution History of U.S. Appl. No. 14/184,207, dated Jun. 2016-May 2017, 124 pages.

Non-Final Office Action issued in U.S. Appl. No. 14/915,408 dated Jul. 27, 2018, 34 pages.

Non-Final Office Action issued in U.S. Appl. No. 14/891,259 dated Aug. 16, 2018, 54 pages.

* cited by examiner

METHOD, CONTENT OWNER DEVICE, COMPUTER PROGRAM, AND COMPUTER PROGRAM PRODUCT FOR DISTRIBUTING CONTENT ITEMS TO AUTHORIZED USERS

CROSS REFERENCE TO RELATED APPLICATION(S)

This application is a 35 U.S.C. § 371 National Phase Entry Application from PCT/SE2014/050240, filed Feb. 27, 2014, which claims priority to U.S. Application No. 61/871,455, filed Aug. 29, 2013 and International Application No. PCT/SE2013/051053, filed Sep. 10, 2013. The above identified applications are incorporated by reference.

TECHNICAL FIELD

This disclosure relates to a method, content owner device, and computer program product for distributing content items to authorized users.

BACKGROUND

The World Wide Web (the "Web") grows larger and larger every day. Many users of the Web access it multiple times a day every day of the week using a variety of communication devices, such as Personal computers (PC), phones, tablets, cameras and Internet Protocol Television (IP-TV) devices. Advances in mobile technologies have made it easier for a user to capture content (e.g. audio content, video content, image content), and different social network and video sharing Web sites make it possible for the user to share such content on the Web. The amount of content is growing rapidly and researchers are working on smarter ways to search, retrieve and share such content.

There are a number of commercial services that makes it possible to search, recommend and share content, such as YouTube and Facebook.

YouTube enables a content owner who uploads a content item (a video file in this case) to YouTube to specify a privacy setting for the content item. For example, the content owner can specify whether the privacy setting for the video should be set to "Public", "Private" or "Unlisted". A "Public" privacy setting allows anyone to watch the video. A "Private" video can only be seen by the content owner and up to fifty invited users. Making a video "Unlisted" means that only people who have the link to the video can view it and the video will not be listed on YouTube. A "Public" video, therefore, has no access control at all, a Private video relies on the server being 100% trusted, and the Unlisted videos relies on "security by obscurity" and also won't satisfy an "honest but curious" model. Similarly, Facebook allows its users to set access rights on information uploaded by the user to Facebook, but the user must rely on Facebook to correctly enforce the user's specified access rights. See e.g., Hart, M., et al., More Content—Less Control: Access Control in the Web 2.0, In Proceedings of the Web 2.0 Security & Privacy Workshop (W2SP'07) (available at www.cs.sunysb.edu/~rob/papers/cbac-w2sp07.pdf, retrieved on Feb. 25, 2014).

What is desired is, for example, an improved method for distributing content items to authorized users.

SUMMARY

A straight forward way for a content owner to ensure that the content owner's content items (e.g., photos and/or videos) can be accessed only by authorized users is for the content owner to encrypt the content items before uploading the content items to a content server (e.g., a Facebook or YouTube server). This has two potential drawbacks: first, the content items will not be searchable; and second, each user wanting to access one of the content items must obtain a key to decrypt the content item. Besides this limitation in usability and complexity, it has the drawback that it provides an "all-or-nothing" access model: once the key is obtained by a user, the user could access all content that was encrypted with that key. Of course, the content owner could use a different encryption key for each content item that it uploads to the content server, but this may require a large number of keys. The content owner could also try to group content items in some way and use one key per group. But it is still unclear how to define these groups since the content owner on the one hand desires to have fine grained access control (implying very small groups of content), and on the other hand use as few keys as possible (implying very large groups of content).

Another option is to delegate access control to the content server which is the model used by YouTube and Facebook. This works well if the content server is 100% trusted. However, it is more natural to assume the server to be "honest-but-curious." This means that the server is assumed to deliver content to all authorized users. However, it is not assumed that server will not attempt to access content to "satisfy its own curiosity," e.g. to do data mining, (un)lawful intercept, or the like. At the other end of the spectrum is a fully distributed solution where the content owner runs his/her own content server. This allows very strong access control for the content owner, but is clearly unmanageable since the content owner needs to be online to answer search queries and worse, to stream content.

Accordingly, described herein are various embodiments for distributing content items to authorized users in a secure way that does not overburden the content owner. In one aspect, for example, there is described a method performed by content owner device (COD). In some embodiments, the method comprises the COD obtaining a first content item and a first tag associated with the first content item. The COD also obtains a first content key CK1 for the first content item. The COD encrypts the first content item using CK1, thereby producing a first encrypted content item. The COD uses at least the first tag and a key derivation function, KDF, to derive a first derived key, DK1. The COD encrypts CK1 using the DK1, thereby producing a first encrypted content key, ECK1. And the COD transmits information to a content server, the information comprising the first encrypted content item and the first tag.

In some embodiments, the COD uses at least the first tag, the key derivation function, and a master key to derive the first derived key, wherein the first tag comprises a keyword associated with the first content item.

In some embodiments, the COD also receives from a user's communication device a first content item identifier for identifying the first content item and a keyword, and, in response to receiving the first content item identifier, determines whether or not the user is authorized to obtain the first content item identified by the first content item identifier. In response to determining that the user is authorized to obtain the first content item, the COD transmits to the user's communication device DK1.

In some embodiments, in response to determining that the user is authorized to obtain the first content item, the COD i) derives DK1 using at least the master key, the KDF, and the keyword and ii) transmits DK1 to the user's communication device after deriving DK1.

In some embodiments the COD also receives from a user's communication device a first content item identifier for identifying the first content item and a keyword, and, in response to receiving the first content item identifier, determines whether or not the user is authorized to obtain the first content item identified by the first content item identifier. The COD, in response to determining that the user is authorized to obtain the first content item, i) retrieves ECK1, ii) decrypts ECK1 using DK1, thereby producing CK1, and iii) transmits to the user's communication device CK1. In some embodiments, after retrieving ECK1 but prior to decrypting ECK1 using DK1, the COD derives DK1 using at least the master key, the KDF, and the keyword.

In some embodiments, the method also includes the communication device transmitting to the content server a content query. The content server, in response to the query, transmits to the communication device a search result satisfying the query, wherein the search result comprises an identifier identifying the first content item. The communication device obtains from the content server, by downloading or streaming, the first encrypted content item. The communication device obtains ECK1. The communication device transmits to the COD a message comprising the first tag. The communication device receives DK1 from the COD. The communication device using DK1 to decrypt ECK1, thereby producing CK1, and the communication device uses the produced CK1 to decrypt the first encrypted content item.

In some embodiments, the communication device transmits to the content server a content query. The content server, in response to the query, transmits to the communication device a search result satisfying the query, wherein the search result comprises an identifier identifying the first content item. The communication device obtains from the content server, by downloading or streaming, the first encrypted content item. The communication device transmits to the COD a message comprising the first tag. The communication device receives from the COD a response message sent by the COD in response to the message, the response comprising CK1. And the communication device uses CK1 received in the response message to decrypt the first encrypted content item.

In some embodiments, the COD obtains a second tag associated with the first content item. The COD derives a second derived key (DK2) using at least the first content item identifier, a master key, the second tag, and the key derivation function. And the COD encrypts CK1 using the DK2, thereby producing a second encrypted content key, ECK2, wherein the information transmitted to the content server further comprises the second tag. In such embodiments, the COD may receive from a second communication device the first content item identifier and the second tag, and, in response to receiving the first content item identifier and the second tag, determine whether or not a user of the second communication device is authorized to obtain the first content item associated with the first content item identifier. The COD, in response to determining that the user is authorized to obtain the first content item, transmits to the user's communication device at least one of DK2 and CK1.

In another aspect there is provided a COD for distributing content items to authorized users. The COD comprises a data processing system and data storage system. The data storage system contains instructions executable by the data processing system. The COD is operative to obtain a first content item and obtain a first tag associated with the first content item. The COD is further operative to obtain a first content key, CK1, for the first content item. The COD is further operative to encrypt the first content item using CK1, thereby producing a first encrypted content item. The COD is further operative to use at least the first tag and a key derivation function to derive a first derived key, DK1. The COD is further operative to encrypt CK1 using the DK1, thereby producing a first encrypted content key, ECK1. And the COD is further operative to transmit information to the content server, the information comprising: the first encrypted content item and the first tag.

In another aspect there is provided a computer program for distributing content items to authorized users. In some embodiments, the computer program comprises computer readable instructions. The computer readable instructions are configured such that when run on a COD, causes the COD to: obtain a first content item; obtain a first tag associated with the first content item; obtain a first content key, CK1, for the first content item; encrypt the first content item using CK1, thereby producing a first encrypted content item; use at least the first tag and a key derivation function to derive a first derived key, DK1; encrypt CK1 using the DK1, thereby producing a first encrypted content key, ECK1; and transmit information to the content server, the information comprising: the first encrypted content item and the first tag.

In another aspect there is provided a COD for distributing content items to authorized users. The COD comprises means for obtaining a first tag associated with a first content item. The COD also comprises means for obtaining a first content key, CK1, for the first content item. The COD also comprises means for encrypting the first content item using CK1, thereby producing a first encrypted content item. The COD also comprises means for using at least the first tag and a key derivation function to derive a first derived key, DK1. The COD also comprises means for encrypting CK1 using the DK1, thereby producing a first encrypted content key, ECK1. The COD also comprises means for transmitting information to the content server, the information comprising: the first encrypted content item and the first tag.

In another aspect there is provided a computer readable storage medium, which comprises the above mentioned computer program.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments.

DETAILED DESCRIPTION

Figure 1:
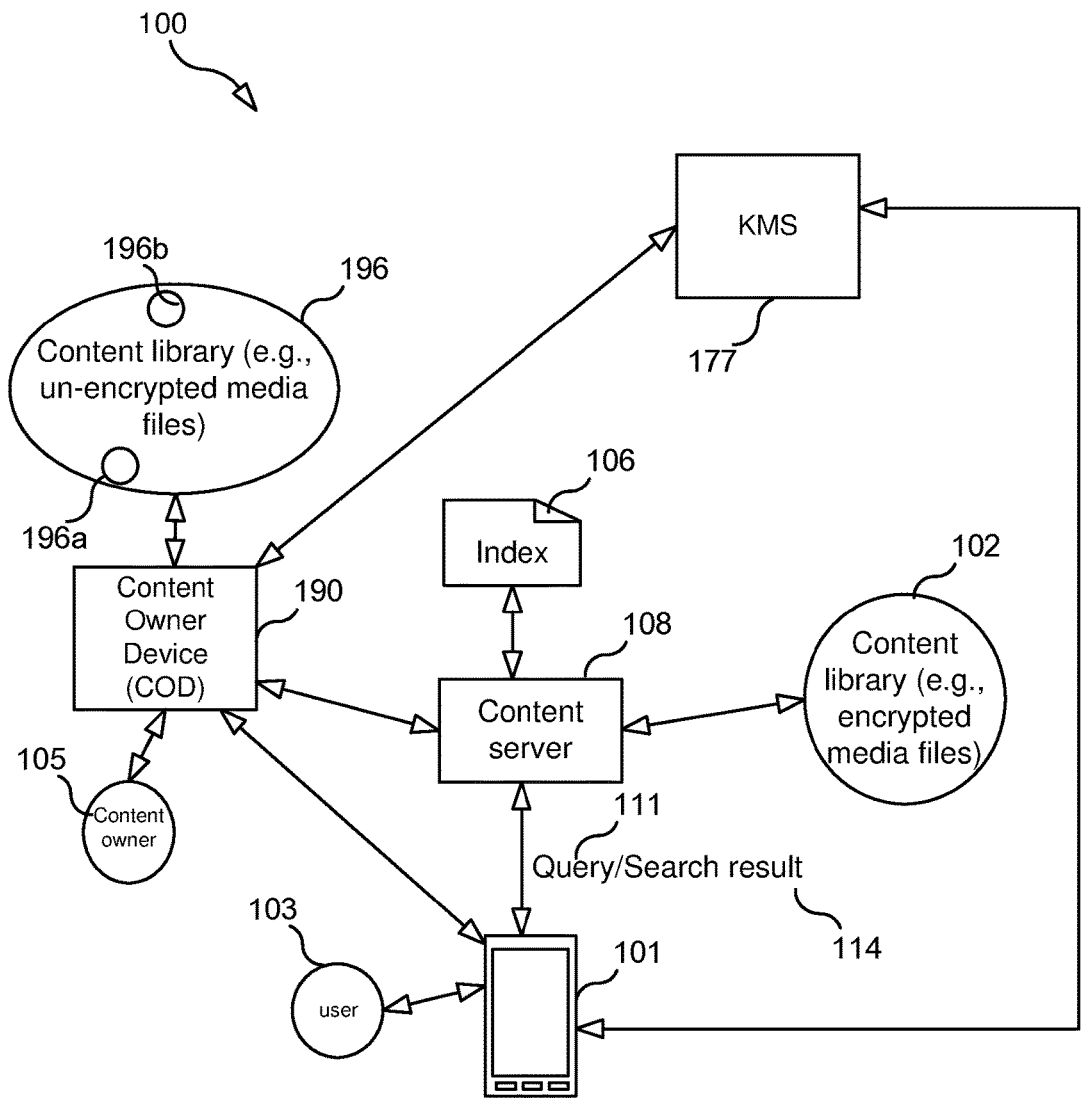
FIG. 1 illustrates functional components of an indexing and search system according to some embodiments.

FIG. 1 illustrate a content distribution system 100 for securely distributing content items to authorized users in way that enables a content owner 105 to use the content distribution services of a third-party content server 108 (e.g., a YouTube or a Facebook content server). As shown in FIG. 1, content distribution system 100 includes a (i.e., at least one) content owner device (COD) 190. COD 190 is a communication device (e.g., smartphone, personal computer, tablet, etc.) owned and/or operated by content owner 105. COD 190 may include (or have access to) a content library 196 (i.e., a set of one or more content items, such as content item 196a and content item 196b). That is, content library 196 may reside on a storage unit that is contained within COD 190 or content library 196 may reside on a storage unit (e.g., USB drive) that is external to COD 190 (i.e., an "external storage unit").

As described above, it is often the case that content owner 105 desires to share content items 196 with other people (e.g., friends, relative, co-workers) using third party content server 108. As also described above, content owner 105 often desires to restrict access to the contents items in the content library 196 to a selected group of people, but yet provide a way for the people in the select group to easily find the content items while at the same time prevent content server 108 itself from accessing the content. This can be accomplished as follows.

Content owner 105 obtains a master key (MK), which is accessible to COD 190 (e.g., MK may be stored on a storage unit internal to COD 190). Content owner 105, if desired, may upload MK to a key management server (KMS) 177. Content owner also may define a search policy and upload the search policy to content server 108. The search policy contains set of one or more rules, such as "user B may search for keyword X, Y, and Z" and "anyone may search for keywords U, V." Content owner 105 at some point obtains content item 196a. Content item 196a may be a video content owner 105 created while on vacation using a camera built into COD 190. Software resident on COD 190 enables content owner to create meta-data for content item 196a, which meta-data may comprise a content item identifier for identifying content item 196a as well as keywords derived from the content of content item 196a. For example, the software may allow content owner 105 to input the content item identifier (e.g., a filename) and a descriptive title for content item 196a and may also automatically analyze content item 196a to generate keywords for content item 196a. For example, the software may include a facial recognition module that enables the software to identify people whose images are in content item 196a and the names of these identified people may be keywords that are included in the meta-data. Alternatively, manual input by the content owner 105 (or some other authorized user) could be used. Content owner 105 uses COD 190 to encrypt content item 196a, thereby producing an encrypted version of content item 196a. COD 190 encrypts content item 196a using a first content key (CK1). CK1 may be a randomly generated key or it may be a key derived from the MK.

Additionally, COD 190 derives a first derived key (DK1) using at least one "tag" associated with content item 196a, a key derivation function (KDF) (e.g., an algorithm that maps a set of inputs to a single output), and CK1. The KDF may be a one-way function. That is, for example, DK1=KDF (CK1, tag, . . . ). As used herein, a "tag" is a set of one or more strings. For example, the tag may comprise one or more of: i) a set of one or more keywords associated with content item 196a (e.g., one or more of keywords included in the meta-data for content item 196a) and ii) the content item identifier for identifying content item 196a. After obtaining DK1, COD 190 encrypts CK1 using DK1 as the encryption key, thereby producing a first encrypted content key (ECK1). It can be noted that DK1 is dependent on the tag, whereas CK1 is not. This enables one single encrypted copy of the content item to be stored/handled by content server 108, yet allowing plural ways to refer to (allow search for and give access to) the same content through creation of plural different DK1 keys, each dependent on a tag, which may consist of a single keyword. This is advantageous as one content item will typically be associated with plural keywords. The fact that plural DK1 keys are created is not critical since each DK1 only occupies a few octets of storage space whereas a (encrypted) content item such as content item 196a may occupy several millions of octets of storage space.

COD 190 then uploads the following information to content server 108: i) the encrypted content item (i.e. the encrypted version of content item 196a), ii) the meta-data for content item 196a, and iii) the tag used to create DK1 (assuming the tag is not already included in the meta-data). Additionally, COD 190 may upload ECK1 to content server 108 and/or to KMS 177. If a separate KMS 177 is used, also some of the meta-data for content item 196a and/or tag may be uploaded to KMS 177 to allow later retrieval of ECK1 using meta-data/tag as identifier. Content server 108 will add the encrypted content item to its content library 102 and update index 106 to index the encrypted content item using the meta-data for the content item. For example, index 106 may include a keyword (e.g., "Obama") and may map the keyword to set of encrypted content items (e.g., photos of Obama). For example, the index may map the keyword to identifiers (e.g. URLs or filenames) of encrypted content items associated with the keyword.

If user 103 wants to obtain content item 196a, user 103 may user his/her communication device 101 (CD) to send a query to content server 108 (e.g., user 103 may use a web browser running on CD 101 to send the query in an HTTP GET message). Content server 108, in response, determines a set of content items that match the query. Additionally, in some embodiments, content server 108, for each content item that matches the query, uses the search policy for the content item to determine whether the search policy indicates that user 103 should not have access to the content item. The CD 101 may be a user equipment such as a mobile phone, a laptop, a desktop or a multimedia unit installed in a vehicle such as a multimedia unit with a display installed in a dashboard of a car, truck or bus.

Content server 108 then may produce a search result page (e.g., an HTML document) that lists the content items that a) match the query and b) user 103 is not precluded from accessing. Content server 108 then transmits the search result page to CD 101, which, in this example, includes the tag that COD 190 provided to content server 108—i.e., the tag used to create DK1. The search result page may also contain a URL identifying the location of the encrypted version of content item 196a so that CD 101 can download the encrypted content item as well as the content item identifier for identifying content item 196a (assuming it is not already included in the tag).

When user 103 selects content item 196a from the search result page, user 103's CD 101 connects to COD 190 and transmits the tag to COD 190 (user 103's credentials—e.g., username and password, may also be provided to COD 190 as COD 190 may be configured to determine, based on the tag and user 103's credentials, whether user 103 may access content item 196a). Assuming user 103 may access content item 196a, COD 190 may either provide DK1 or CK1 to CD 101. If COD 190 provides only DK1, CD 101 may retrieve ECK1, from content server 108 or KMS 177, and decrypt ECK1 using DK1 to obtain CK1. In either event, prior to providing DK1 or CK1 to CD 101, COD 190 may need to re-derive DK1. COD 190 may re-derive DK1 using the KDF, the tag transmitted by CD 101, and MK.

Once CD 101 obtains CK1, CD 101 can decrypt the encrypted version of content item 196a, which it can download or stream from content server 108, thereby providing user 103 with access to content item 196a.

Figure 2:
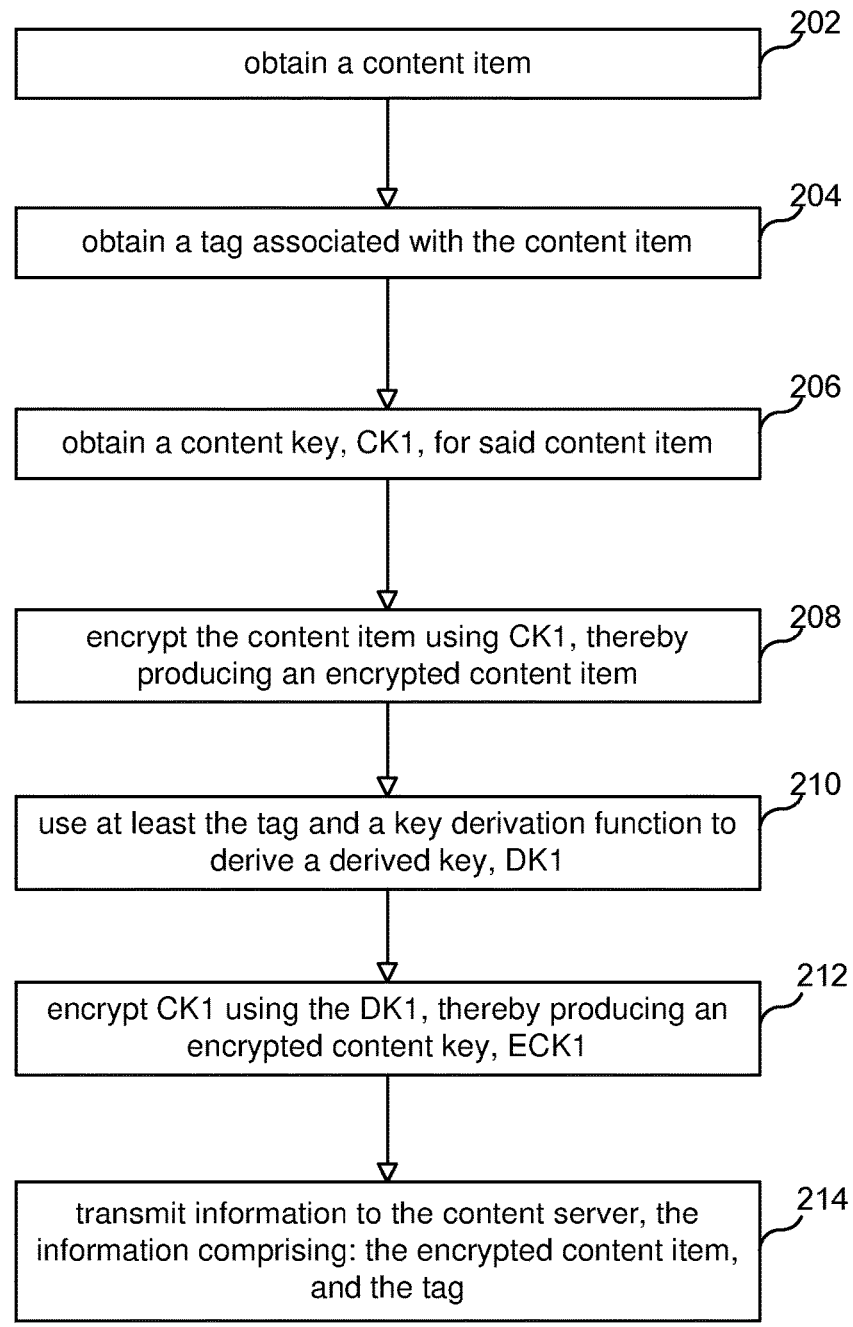
FIG. 2 is a flow chart illustrating a process, according to some embodiments, that may be performed by content owner device.

Referring now to FIG. 2, FIG. 2 is a flow chart illustrating a process 200, according to some embodiments, that may be performed by COD 190. Process 200 may begin in step 202, where COD 190 obtains first content item 196a.

In step 204, COD 190 obtains a first tag associated with the first content item 196a.

In step 206, COD 190 obtains a first content key, CK1, for said first content item 196a.

In step 208, COD 190 encrypts the first content item 196a using CK1, thereby producing a first encrypted content item.

In step 210, COD 190 uses at least the first tag and a key derivation function to derive a first derived key, DK1. In some embodiments, the COD 190 uses at least the first tag, the key derivation function, and a master key to derive the first derived key, wherein the first tag comprises a keyword associated with the first content item. The first tag may also comprise a content item identifier identifying the first content item.

In step 212, COD 190 encrypts CK1 using the DK1, thereby producing a first encrypted content key, ECK1.

In step 214, COD 190 transmitting information to a content server 108, the information comprising: the first encrypted content item, the first tag.

Figure 3:
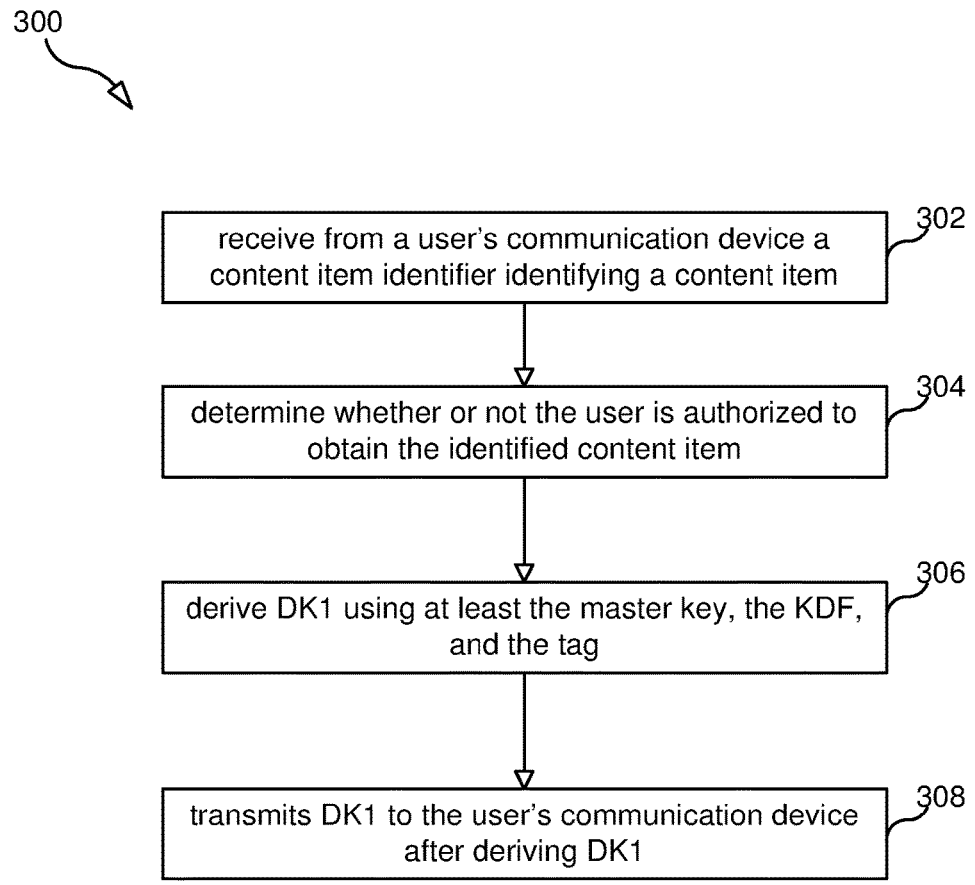
FIG. 3 is a flow chart illustrating a process, according to some embodiments, that may be performed by content owner device.

FIG. 3 is a flow chart illustrating a process 300, according to some embodiments, that may be performed by COD 190. Process 300 may begin in step 302, where COD 190 receives from a user 103's CD 101 a content item identifier identifying content item 196a. For example, in some embodiments, COD 190 receives from user 103's CD 101 the tag used by COD 190 to derive DK1, which tag includes a keyword and the content item identifier. In embodiments where the tag does not include the content item identifier, CD 101 transmits to COD 190 the tag and the content item identifier so that in step 302 COD 190 receives both the tag and the content item identifier. In step 304, COD 190, in response to receiving the content item identifier, determines whether or not the user is authorized to obtain the content item identified by the received content item identifier. Recall that the user 103 being authorized to search for a specific keyword does not imply that the user is authorized to access specific content item 196a associated with that keyword. In step 306, COD 190 derives DK1 using at least, the KDF, the MK and the tag. In step 308, COD 190 transmits DK1 to the user 103' CD 101. Steps 306 and 308 may be performed by COD 190 in response to COD 190 determining that the user is authorized to obtain the content item (196a).

Figure 4:
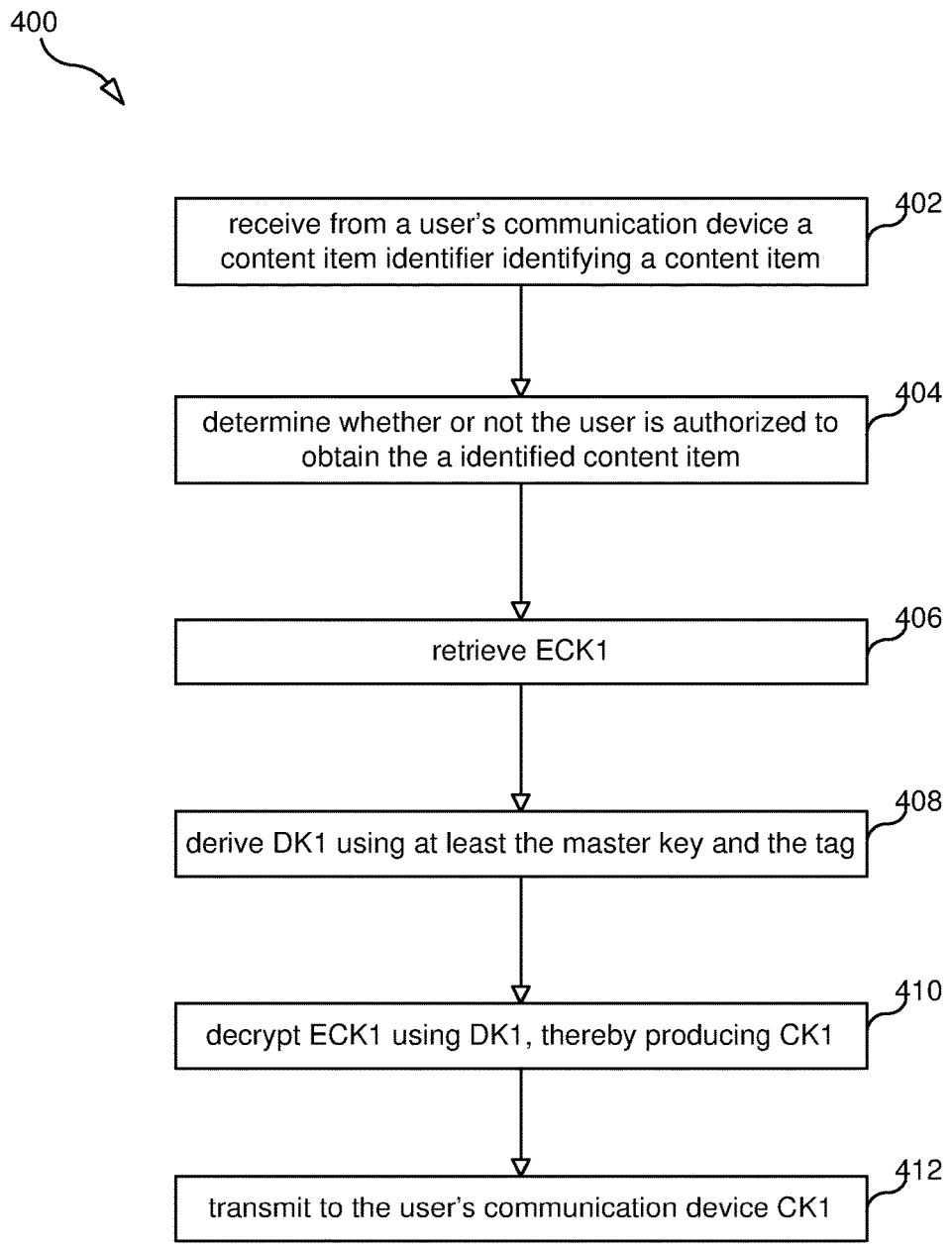
FIG. 4 is a flow chart illustrating a process, according to some embodiments, that may be performed by content owner device.

FIG. 4 is a flow chart illustrating a process 400, according to some embodiments, that may be performed by COD 190. Process 400 may begin in step 402, where COD 190 receives from a user 103's CD 101 a content item identifier identifying content item 196a. For example, as mentioned above, in some embodiments, COD 190 receives from user 103's CD 101 the tag used by COD 190 to derive DK1, which tag includes a keyword and the content item identifier. In embodiments where the tag does not include the content item identifier, CD 101 transmits to COD 190 the tag and the content item identifier so that in step 402 COD 190 receives both the tag and the content item identifier. In step 404, COD 190, in response to receiving the content item identifier, determines whether or not the user is authorized to obtain the identified content item 196a. In step 406, COD 190 retrieves ECK1. In some embodiments, COD 190 retrieves ECK1 from content server 108, but in some other embodiments COD 190 may retrieve ECK1 from KMS 177. In step 408, COD 190 derives DK1 using at least, the KDF, the MK and the tag. In step 410, COD 190 decrypts ECK 1 using DK1, thereby producing CK1. In step 412, COD 190, transmits CK1 to user 103's communication device. Steps 406-412 may be performed as a result of COD 190 determining that user 103 is authorized to obtain content item 196a.

Figure 5:
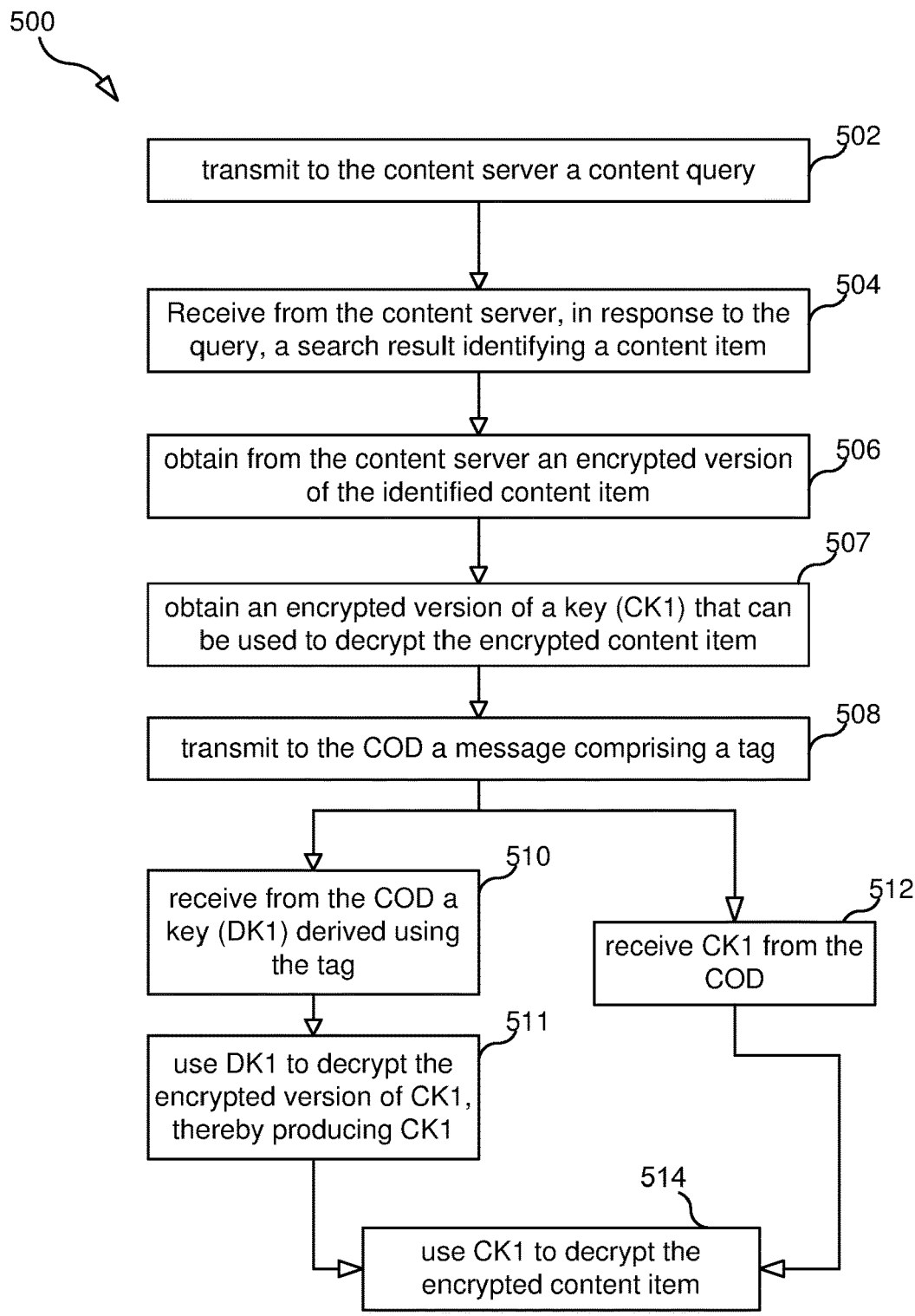
FIG. 5 is a flow chart illustrating a process, according to some embodiments, that may be performed by a user's communication device.

FIG. 5 is a flow chart illustrating a process 500, according to some embodiments, that may be performed by CD 101. Process 500 may begin in step 502, where CD 101 transmits to content server 108 a content query. For example, in step 502, The CD 101 may transmit to content server 108 an HTTP GET request message that includes a query for content. In step 504, CD 101 receives from content server 108, in response to the query, a search result identifying a content item (e.g., item 196a). In step 506, CD 101 obtains from content server 108 an encrypted version of the identified content item. In step 507, CD 101 obtains ECK1 (i.e., the encrypted version of CK1). In some embodiments, CD 101 obtains ECK1 from KSM 177. For instance, CD 101 may obtain ECK1 from KMS 177 in response to CD 101 receiving a user input indicating that the user desires to obtain the content item. In yet some other embodiments, CD 101 obtains ECK1 from content server 108, either before or after CD 101 receives a user input indicating that the user desires to obtain the content item. In step 508, CD 101, in response to receiving a user input indicating that the user desires to obtain the content item, transmits to COD 190 a message (e.g., an HTTP GET message) comprising the tag that was used by COD 190 to derive DK1. In some embodiments, the tag is included in the received search result. In embodiments where the tag does not include a content item identifier that identifies the content item, then in step 508 CD 101 may transmit not only the tag, but also a content item identifier that identifies the content item. In some embodiments process 500 proceeds to steps 510 and 511 after step 508, whereas in other embodiments process 500 proceeds to step 512 after step 508. In step 510, CD 101 receives from COD 190 a derived key (DK1) that was derived by COD 190 using the tag. In step 511, CD 101 uses DK1 to decrypt the encrypted version of CK1, thereby obtaining CK1. In step 512, CD 101 receives CK1 from COD 190. In step 514, CD 101 uses CK1 to decrypt the encrypted content item.

Figure 6:
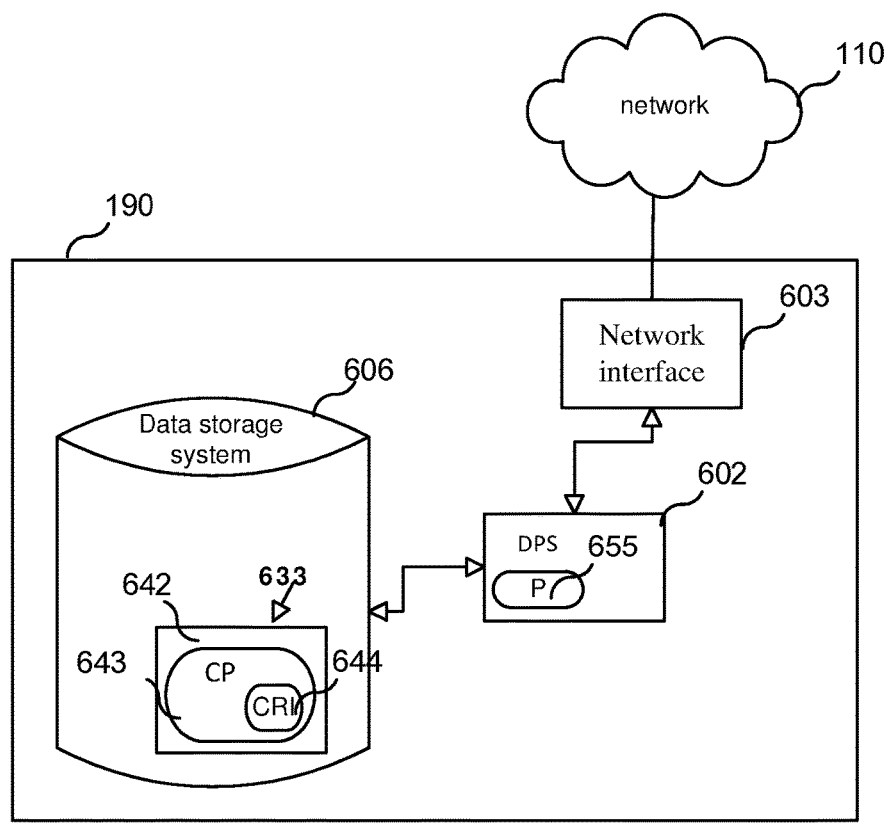
FIG. 6 is a block diagram of a content owner device according to some embodiments.

FIG. 6 is a block diagram of one embodiment of COD 190. As shown in FIG. 6, COD 190 may include or consist of: a data processing system (DPS) 602, which may include one or more processors 655 (e.g., a general purpose microprocessor) and/or one or more circuits, such as an application specific integrated circuit (ASIC), field-programmable gate arrays (FPGAs), a logic circuit, and the like; a network interface 603 for use in connecting COD 190 to a network 110 (e.g., the Internet or other network); and a data storage system 606, which may include one or more non-volatile storage devices and/or one or more volatile storage devices (e.g., random access memory (RAM)). In embodiments where COD 190 includes a processor 655, a computer program product (CPP) 633 may be provided. CPP 633 includes or is a computer readable storage medium (CRM) 642 storing a computer program (CP) 643 comprising computer readable instructions (CRI) 644. CRM 642 is a non-transitory computer readable medium, such as, but not limited, to magnetic media (e.g., a hard disk), optical media (e.g., a DVD), solid state devices (e.g., random access memory (RAM), flash memory), and the like. In some embodiments, the CRI 644 of computer program 643 is configured such that when executed by data processing system 602, the CRI 644 causes the COD 190 to perform steps described above (e.g., steps described above with reference to the flow charts shown in the drawings related to the COD). In other embodiments, COD 190 may be configured to perform steps described herein without the need for a computer program. That is, for example, data processing system 602 may consist merely of one or more ASICs, i.e. being a pure hardware implementation. Hence, the features of the embodiments described herein may be implemented in hardware and/or software.

Figure 7:
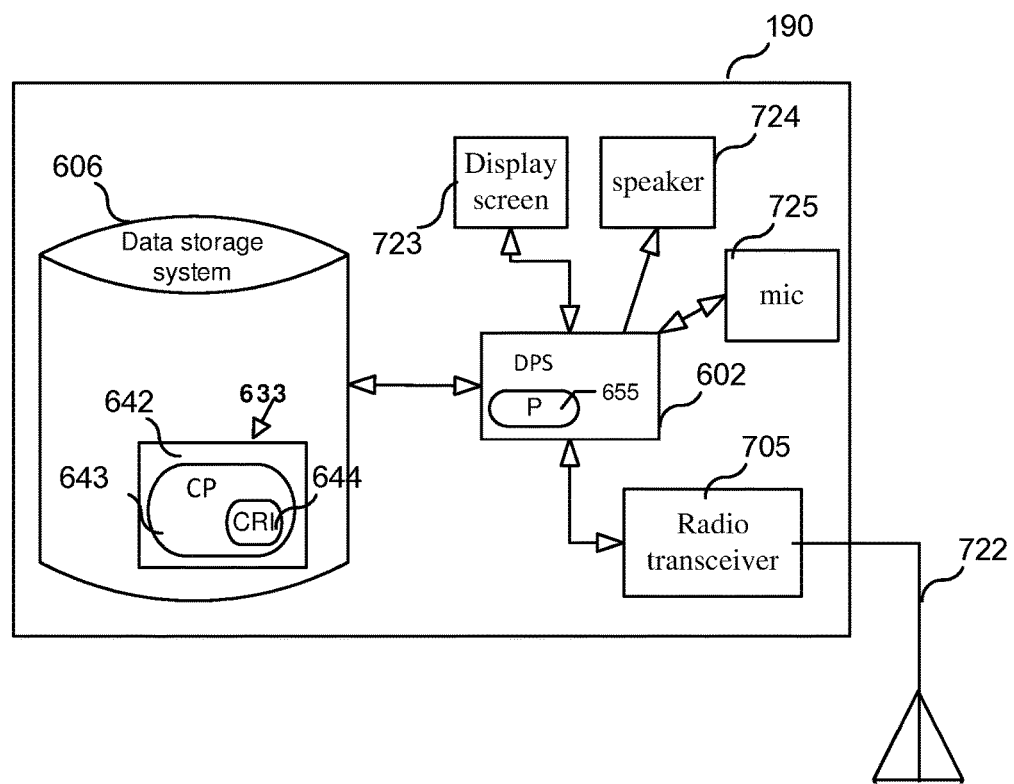
FIG. 7 is a block diagram of the content owner device according to another embodiment.

FIG. 7 is a block diagram of another embodiment of COD 190. This embodiment is similar to the one shown in FIG. 6, with the exception that in this embodiment COD 190 includes a radio transceiver 705 coupled to an antenna 722. Additionally, COD 190 may include a touch sensitive display screen 723, a speaker 724, and a microphone 725.

Figure 8:
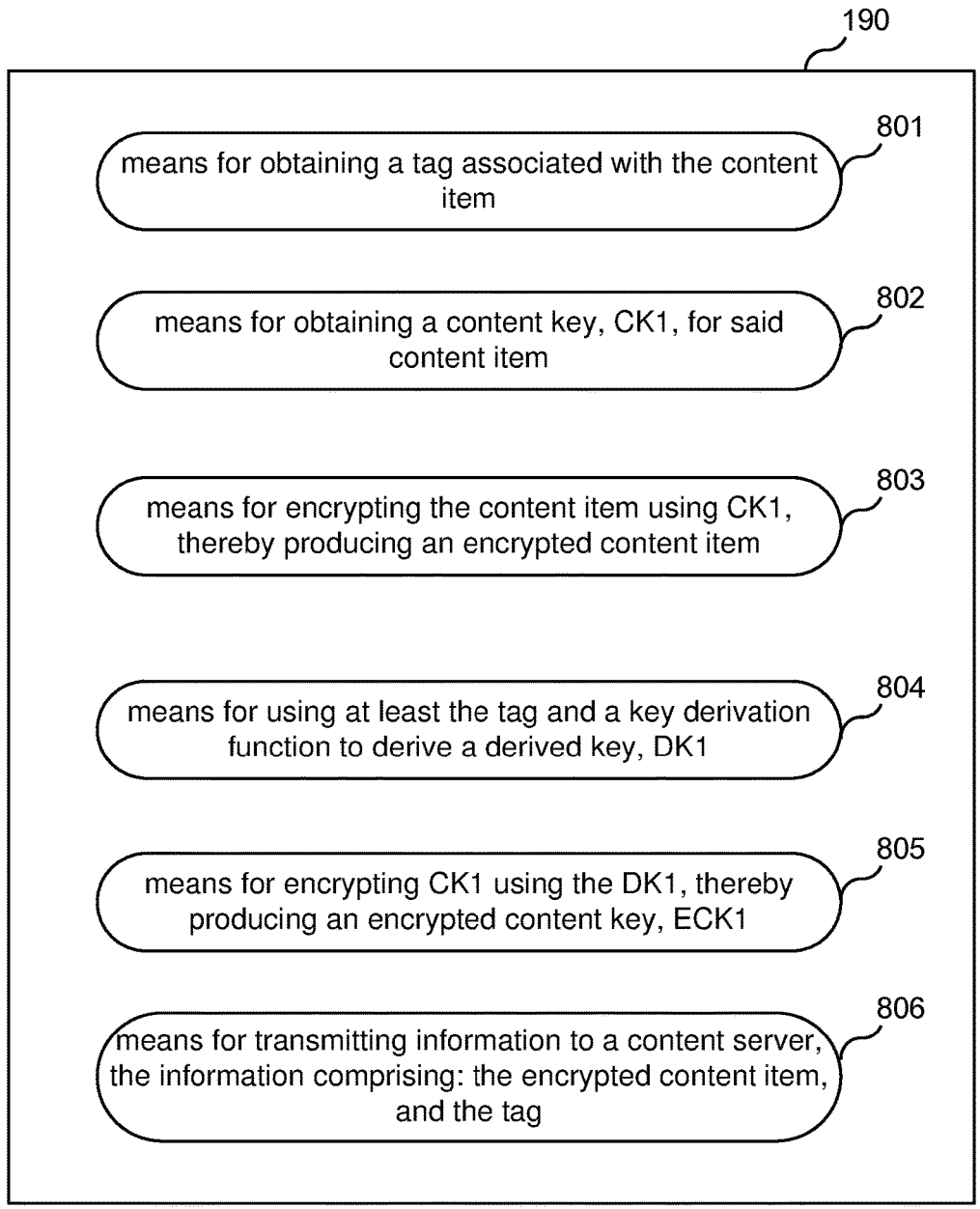
FIG. 8 is a diagram illustrating components of a content owner device according to some embodiments.

FIG. 8 is a functional block diagram illustrating components of COD 190, according to some embodiments. As illustrated in FIG. 8, in some embodiments, COD 190 includes: means 801 for obtaining a tag associated with a content item; means 802 for obtaining a content key, CK1, for said content item; means 803 for encrypting the content item using CK1, thereby producing an encrypted content item; means 804 for using at least the tag and a key derivation function to derive a derived key, DK1; means 805 for encrypting CK1 using the DK1, thereby producing an encrypted content key, ECK1; and means 806 for transmitting information to a content server, the information comprising: the encrypted content item and the tag. The means described in FIG. 8 is in one embodiment implemented purely by software, and in another purely by hardware.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for distributing content items to authorized users, the method comprising:
a content owner device (COD) obtaining a first content item;
the COD obtaining a first tag associated with the first content item;
the COD obtaining a first content key (CK1) for said first content item;
the COD encrypting the first content item using CK1, thereby producing a first encrypted content item;
the COD using at least the first tag and a key derivation function (KDF) to derive a first derived key (DK1);
the COD encrypting CK1 using DK1, thereby producing a first encrypted content key (ECK1);
the COD transmitting information to a content server, the information comprising: the first encrypted content item and the first tag;
the COD receiving, from a communication device of a user, a first content item identifier for identifying the first content item and a keyword;
the COD, in response to receiving the first content item identifier, determining whether or not the user is authorized to obtain the first content item identified by the first content item identifier; and
the COD, in response to determining that the user is authorized to obtain the first content item, transmitting to the communication device of the user, DK1 and/or CK1.

2. The method of claim 1, wherein the COD uses at least the first tag, the KDF, and a master key to derive DK1, and wherein the first tag comprises a keyword associated with the first content item.

3. The method of claim 1, wherein, in response to determining that the user is authorized to obtain the first content item, the COD i) derives DK1 using at least a master key, the KDF, and the keyword and ii) transmits DK1 to the communication device of the user after deriving DK1.

4. The method of claim 1, further comprising:
the COD, in response to determining that the user is authorized to obtain the first content item, i) retrieving ECK1, ii) decrypting ECK1 using DK1, thereby producing CK1, and iii) transmitting to the communication device of the user, CK1.

5. The method of claim 4, wherein, after retrieving ECK1 but prior to decrypting ECK1 using DK1, the COD derives DK1 using at least a master key, the KDF, and the keyword.

6. The method of claim 4, further comprising:
the communication device transmitting to the content server, a content query;
the content server, in response to the content query, transmitting to the communication device, a search result satisfying the content query, wherein the search result comprises an identifier identifying the first content item;
the communication device obtaining from the content server, by downloading or streaming, the first encrypted content item;
the communication device transmitting to the COD a message comprising the first tag;
the communication device receiving from the COD a response message sent by the COD in response to said message, said response message comprising CK1; and
the communication device using CK1 received in the response message to decrypt the first encrypted content item.

7. The method of claim 1, further comprising:
the communication device transmitting to the content server, a content query;
the content server, in response to the content query, transmitting to the communication device, a search result satisfying the content query, wherein the search result comprises an identifier identifying the first content item;

the communication device obtaining from the content server, by downloading or streaming, the first encrypted content item;

the communication device obtaining ECK1;

the communication device transmitting to the COD, a message comprising the first tag;

the communication device receiving DK1 from the COD;

the communication device using DK1 to decrypt ECK1, thereby producing CK1; and the communication device using the produced CK1 to decrypt the first encrypted content item.

8. The method of claim 1, further comprising:

the COD obtaining a second tag associated with the first content item, the second tag being different than the first tag;

the COD deriving a second derived key (DK2) using at least the first content item identifier, a master key, the second tag, and the KDF, wherein DK2 is not the same as DK1; and the COD encrypting CK1 using DK2, thereby producing a second encrypted content key (ECK2), which is not the same as ECK1, wherein the information transmitted to the content server further comprises the second tag.

9. The method of claim 8, further comprising:

the COD receiving from a second communication device, the first content item identifier and the second tag;

the COD, in response to receiving the first content item identifier and the second tag, determining whether or not a user of the second communication device is authorized to obtain the first content item associated with the first content item identifier; and the COD, in response to determining that the user of the second communication device is authorized to obtain the first content item, transmitting to the communication device of the user, at least one of DK2 and CK1.

10. A content owner device (COD) for distributing content items to authorized users, the COD comprising a processor and a non-transitory computer readable medium (CRM), said CRM containing computer readable instructions executable by said processor, wherein said COD is operative to:

obtain a first content item;

obtain a first tag associated with the first content item;

obtain a first content key (CK1) for said first content item;

encrypt the first content item using CK1, thereby producing a first encrypted content item;

use at least the first tag and a key derivation function to derive a first derived key (DK1);

encrypt CK1 using DK1, thereby producing a first encrypted content key (ECK1);

transmit information to a content server, the information comprising: the first encrypted content item and the first tag;

receive from a communication device of a user, a first content item identifier identifying the first content item;

in response to receiving the first content item identifier, determine whether or not the user is authorized to obtain the first content item identified by the first content item identifier; and in response to determining that the user is authorized to obtain the first content item, transmit to the communication device of the user, DK1 and/or CK1.

11. The COD of claim 10, wherein the COD is further operative to use at least the first tag, the key derivation function, and a master key to derive DK1, and wherein the first tag comprises a keyword associated with the first content item.

12. The COD of claim 10, wherein the COD is further operative to:

in response to determining that the user is authorized to obtain the first content item, i) derive DK1 using at least a master key and the first tag and ii) transmit DK1 to the communication device of the user after deriving DK1.

13. The COD of claim 10, wherein the COD is further operative to:

in response to determining that the user is authorized to obtain the first content item, i) retrieve ECK1, ii) decrypt ECK1 using DK1, thereby producing CK1, and iii) transmit to the communication device of the user, CK1.

14. The COD of claim 13, wherein, after retrieving ECK1 but prior to decrypting ECK1 using DK1, the COD is operative to derive DK1 using at least a master key and the first tag.

15. The COD of claim 10, wherein the COD is further operative to:

obtain a second tag associated with the first content item;

derive a second derived key (DK2) using at least the first content item identifier, a master key, the second tag, and the key derivation function; and encrypt CK1 using DK2, thereby producing a second encrypted content key (ECK2), and wherein the information transmitted to the content server further comprises the second tag.

16. The COD of claim 15, wherein the COD is further operative to:

receive from a second communication device, the first content item identifier and the second tag;

determine whether or not a user of the second communication device is authorized to obtain the first content item associated with the first content item identifier, in response to receiving the first content item identifier and the second tag; and transmit to the communication device of the user, at least one of DK2 and CK1 in response to determining that the user of the second communication device is authorized to obtain the first content item.

17. A computer program product comprising a non-transitory computer readable medium storing computer readable instructions which, when run on a content owner device (COD), causes the COD to:

obtain a first content item;

obtain a first tag associated with the first content item;

obtain a first content key (CK1) for said first content item;

encrypt the first content item using CK1, thereby producing a first encrypted content item;

use at least the first tag and a key derivation function to derive a first derived key (DK1);

encrypt CK1 using DK1, thereby producing a first encrypted content key (ECK1); and transmit information to a content server, the information comprising: the first encrypted content item and the first tag, wherein the computer readable instructions cause the COD to, in response to receiving from a communication device of a user a first content item identifier for identifying the first content item and a keyword, determine whether or not the user is authorized to obtain the first content item identified by the first content item identifier.

18. A content owner device (COD) for distributing content items to authorized users, the COD comprising:
   a transmitter;
   a memory; and
   a processor coupled to the memory and the transmitter, wherein the COD is configured to:
   obtain a first tag associated with a first content item;
   obtain a first content key (CK1) for said first content item;
   encrypt the first content item using CK1, thereby producing a first encrypted content item;
   use at least the first tag and a key derivation function to derive a first derived key (DK1);
   encrypt CK1 using DK1, thereby producing a first encrypted content key (ECK1);
   employ the transmitter to transmit information to a content server, the information comprising: the first encrypted content item and the first tag;
   in response to receiving from a communication device of a user, a first content item identifier for identifying the first content item and a keyword, determine whether or not the user is authorized to obtain the first content item identified by the first content item identifier; and
   in response to determining that the user is authorized to obtain the first content item, transmit to the communication device of the user, DK1 and/or CK1.

* * * * *